(12) United States Patent
Le Mere

(10) Patent No.: US 6,785,032 B1
(45) Date of Patent: Aug. 31, 2004

(54) LASER COUNTERMEASURE SYSTEM AND METHOD

(75) Inventor: Charles Elwood Le Mere, San Pedro, CA (US)

(73) Assignee: Recon/Optical, Inc., Barrington, IL (US)

(*) Notice: Subject to any disclaimer, the term of this patent is extended or adjusted under 35 U.S.C. 154(b) by 1826 days.

(21) Appl. No.: 07/225,180

(22) Filed: Jul. 28, 1988

(51) Int. Cl.[7] .............................................. G02B 26/02
(52) U.S. Cl. ..................... 359/227; 359/230; 359/614
(58) Field of Search ............................... 350/353–356, 350/311, 314, 315; 250/201, 205, 201.1–203.7; 332/7.51; 359/227, 230, 276–279, 601, 614

(56) References Cited

U.S. PATENT DOCUMENTS

| | | | | |
|---|---|---|---|---|
| 3,480,347 A | * | 11/1969 | Walter et al. | 350/356 X |
| 3,699,347 A | * | 10/1972 | Buchan et al. | 350/356 X |
| 4,350,413 A | * | 9/1982 | Bottka et al. | 350/356 |
| 4,724,311 A | * | 2/1988 | Mechlenburg | 250/201 |

* cited by examiner

Primary Examiner—Stephen C. Buczinski
Assistant Examiner—Brian Andrea
(74) Attorney, Agent, or Firm—McDonnell Boehnen Hulbert & Berghoff LLP

(57) ABSTRACT

A laser countermeasure system uses a fluence trigger along an optical path between an entrance and a detector at an output. The fluence trigger detects laser radiation and blocks the passage thereof beyond the trigger. A shutter at the front end can be operated in response to detection by the trigger. A threat analyzer also receives radiation and automatically breaks the radiation into spectral components for correlation to appropriate filters to remove the harmful coherent radiation. A tunable filter and/or a filter wheel is interposed along the optical path and is controlled by an adjustment system, illustratively servo controls. The adjustment system responds to the threat analyzer to select and interpose automatically the proper filter(s) to attenuate or block the coherent radiation. Thereafter, the fluence trigger and/or shutter operate to restore full operation along the optical path. The system and method provide look-through capability and mission continuity in the face of unknown laser threats.

20 Claims, 2 Drawing Sheets

LASER COUNTERMEASURE SYSTEM AND METHOD

FIELD OF THE INVENTION

This invention relates to countermeasures against laser attacks on sensor systems.

BACKGROUND OF THE INVENTION

Directed energy weapons ("DEW"), principally lasers, have become very prominent subjects in current threat assessments. The most developed DEW technology applications utilize various types of lasers as sources of jamming and destructive energy. Laser energy poses a threat to military personnel. Laser energy from ruby or YAG laser, or others, can cause severe damage to unprotected eyes. Also, other sensors on sighting systems can be incapacitated by laser energy. Low power lasers can temporarily incapacitate airborne platform sensors, including air crew eyes, and even cause severe and permanent damage to sensors at distances which greatly exceed the maximum ranges of most conventional air-to-ground weapons. Sensors in all spectral regions are at risk, from visible through the mid and far infrared wavelengths.

The requirements for effective countermeasures are critical. Effective countermeasures must not only protect personnel, sensors and military structures from physical damage, but also they must provide the means to insure mission continuity. That is, they must provide the "look-through" capability in which sensors are protected from temporarily incapacitating or destructive laser radiation by means which will have no significant effect on mission execution.

In addition to low power lasers, somewhat more powerful fixed frequency laser weapon systems have been prototyped and could be fielded by aggressors very quickly. Whether high or low in power, such laser threats call for countermeasures which in general require energy blocking or absorbing devices to filter out potentially harmful radiation.

For example, Roberts and Honeycutt, U.S. Pat. No. 4,673,250 entitled "$CO_2$ Laser Weapon Countermeasure" issued Jun. 16, 1987 describes a chemical substance to be dispensed. Having a low diffusion coefficient and a high absorption coefficient for laser radiation, it causes incident laser radiation to bloom, thereby to protect targets. This provides no look-through, however.

Similarly, Karney, U.S. Pat. No. 3,992,628 entitled "Countermeasure System for Laser Radiation," issued Nov. 16, 1976. It defends against laser beam target designators by interposing an aerosol between the laser source and the target to attenuate the beam, but it has no look-through.

Another approach has been Milling, U.S. Pat. No. 3,986,690 entitled "Laser Defense And Countermeasure System for Aircraft," issued Oct. 19, 1976. It discloses a passive defense system using a second skin as a retroreflector. Energy is absorbed when the retroreflective layer is destroyed by a laser. This approach protects equipment and personnel but not their sensors, and has no look-through.

Additionally, various types of filtering technology are currently available and more are under development. These technologies can provide protection and lookthrough capability against low power lasers of known wavelength. However, all fixed wavelength filter technologies exhibit unique strengths and weaknesses. Generally, these characteristics involve trade-offs among achievable optical density, photopic and scotopic transmissivity, and achievable width of field of view. Secondary characteristics such as ballistic robustness, shelf life, weight, and environmental stability are also necessary concerns.

Frequency agile or tunable lasers are now commonly available in laboratories and other facilities, and several types could be fielded as weapons in the neat future. Although fixed wavelength laser countermeasures will continue to be required in many applications to provide safety and hazard protection, it is necessary now to provide countermeasures to broadband, tunable threats. Tunable lasers pose serious inband problems for all optical and electro-optical sensors, ranging from eyes to far infrared ("FLIR") systems. Tunable threats also complicate out-of-band damage problems faced by external optics and aircraft structures.

There are four types or levels of broadband threat: (1) tune before engagement; (2) simultaneous multiple wavelength engagement; (3) discrete wavelength tuning during engagement; and (4) continuous tuning during engagement. The first three of these broadband threats are called quasi-tunable threats. That is, an engagement consists of an attack using one or more unknown but discrete wavelengths. Quasi-tunable threats cannot be countered by fixed frequency filter technologies. This class of threat requires tunable countermeasures.

In the tune before engagement threat, the attacking laser wavelength is unknown but is fixed throughout an engagement. Tuning or wavelength changes would be accomplished between engagements. Similarly, the simultaneous multiple wavelength engagement involves a simultaneous attack by two or more unknown but fixed wavelength lasers. Tuning would be accomplished between engagements. In the discrete wavelength tuning during engagement, the attacking laser energy shifts to discrete (and potentially predictable) wavelengths during an attack. Raman shifting would be typical of this type of threat. Engagement phases would occur at fixed frequencies. Elapsed time between phases would normally exceed one second.

The fourth broadband threat, continuous tuning during engagement, involves an attack by laser energy which is tuned continuously across a wide range of frequencies, with individual wavelength dwell times in the picosecond region. Some current dye lasers, for example, exhibit continuous tunability. Such continuous tuning or frequency change constitutes the most difficult laser threat to counter. This type of threat requires very fast continuous tuning countermeasures with linear predictive capability and/or a totally new class of agile or multiband sensors. It is an object of the present invention to provide such a countermeasure.

As noted supra, two important aspects to any solution to the laser threat are to protect the sensor or structure and provide for mission continuity. Mission continuity becomes particularly difficult to achieve when dealing with broadband threats. Another object of the present invention is to provide such countermeasures which protect the sensor and structure and provide look-through capability for mission continuity.

Another object of the present invention is to detect and identify coherent light at some predetermined threshold energy level, protect against it, and provide lookthrough without significantly altering the mission profile.

An object of the invention is to provide a system with multiple capabilities which are orchestrated and fast operating.

To defend against continuously tunable threats specifically, it is an object of the present invention to provide a system which can include a linear predictive capability with a coherent light detection and identification system. This capability would predict the direction and rate of change of the continuous output of a synchronously pumped die laser.

SUMMARY OF THE INVENTION

According to various aspects of the invention, a laser countermeasure system intercepts the leading edge of an incoming pulse of laser energy fast enough to prevent damage to detectors or injury to the human eye. It holds off harmful radiation for a certain amount of time needed for identification of the wavelength of the incoming radiation and tuning of a filtering mechanism, preferably a narrow band filtering mechanism, to block selectively the incoming harmful radiation. Then it restores itself to normal operation with the filtering mechanism in place. In other applications where damage to a sensor is not the concern, the present invention may reduce to automatically identifying the frequency of incident radiation and, in response, automatically interposing one or more filters corresponding to the radiation.

BRIEF DESCRIPTION OF THE DRAWINGS

In describing an embodiment of the present invention, reference is made to accompanying drawings wherein.

DESCRIPTION OF A PREFERRED EMBODIMENT

Figure 1:
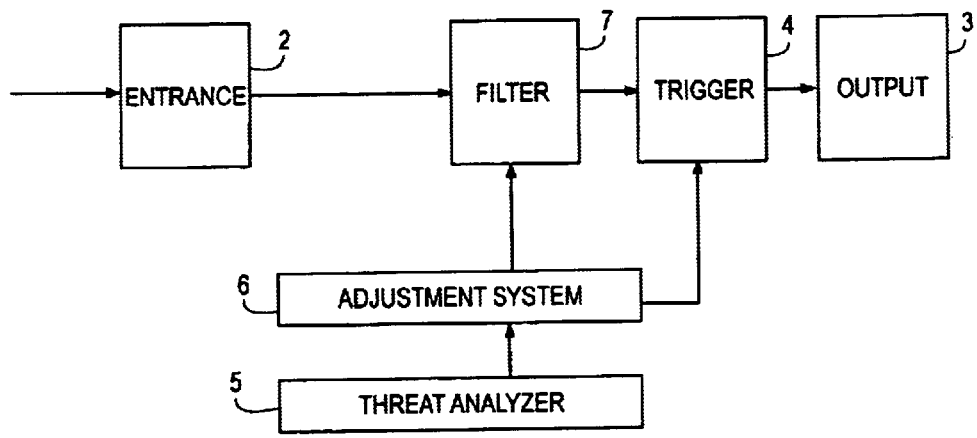
FIG. 1 represents a simplified system according to the present invention.

FIG. 1 represents one simplified system which executes the functions outlined above and is useful to explain basic aspects of the present invention in an application where damage to sensors or detectors is the concern.

The system of FIG. 1 includes a representative input or entrance 2 through which radiation passes to be sensed or detected at an output 3. The term "radiation" is used expansively to include all electromagnetic radiation and all other forms of energy to be sensed at output 3. Entrance 2 may comprise an aperture, with or without a shutter or other optical device. Output 3 represents an output to a display device or to another optical system, such as the eyes of a crewman using the system. It will be appreciated that although the direction of travel of the radiation in FIG. 1 is linear, various devices can be used within the scope of the invention to alter the optical path.

A trigger device 4 is interposed along the path, referred to herein as an optical path, between entrance 2 and output 4. The main function of trigger device 4 so far as this invention is concerned is to attenuate substantially or block the passage of harmful coherent radiation to output 3. Thus, device 4 reacts to coherent light at or beyond a predetermined intensity so that when such coherent light is admitted beyond entrance 2 and detected, trigger device 4 shields the system at output 3 by attenuating or blocking the passage of all harmful radiation beyond device 4.

A threat analyzer 5 makes a fast determination of the frequency of the incident coherent radiation. Analyzer 5 can be engaged and operative at all times the system is in use. It will be understood that analyzer 5 is provided with a sample of the incident coherent radiation. This can be achieved by an additional entrance aperture or the like for analyzer 5 or a division or splitting in some fashion of radiation entering entrance 2, by a beamsplitter, for example.

Once analyzer 5 determines the frequency of the coherent radiation, an adjustment system 6 responsively coupled to analyzer 5 makes proper adjustments at high speed to a filter 7 which is interposed along the optical path of the main sensor system. Once the proper filter is in place, trigger device 4 permits radiation to pass therebeyond. Trigger 4, depending on what device is used, can be responsively coupled to adjustment system 6 so that it is alerted when the countermeasure (filter) has been engaged. Alternatively, trigger 4 can be automatic in operation, requiring no signal from either systems 5 or 6 to remove its blocking or attenuating function and restore the sensor system to useful status.

Several elements presented in FIG. 1 are known separately, but to date they have not, it is believed, been combined to form a fully automated system. Thus, it will be understood that according to some broad aspects of the present invention, an optical path is defined between an entrance and an output. A trigger device is interposed along the path. A threat analyzer is coupled to receive incident radiation and to determine the frequency component(s) thereof. This causes an adjustment system to operate a tunable filter to counter the attack and to restore the system to full operation.

Figure 2:
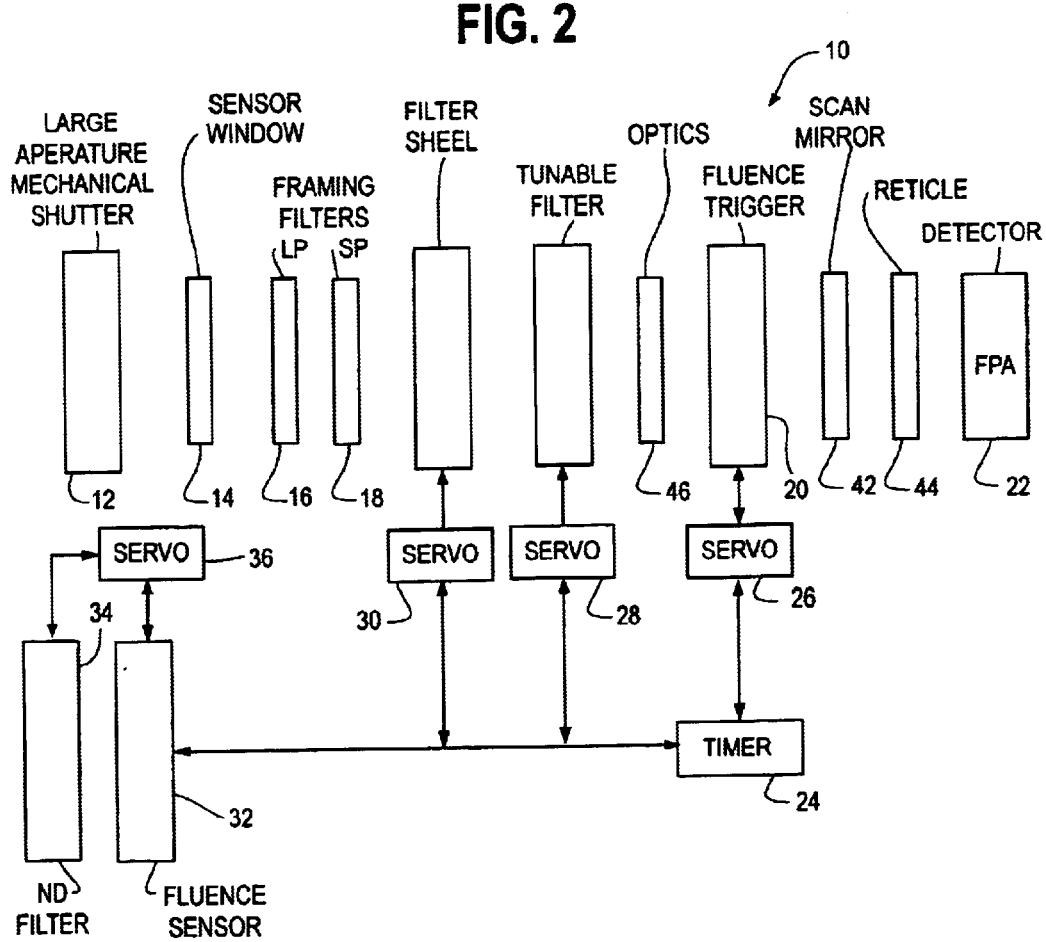
FIG. 2 shows a generalized system according to the present invention.

FIG. 2 shows a generic system according to the present invention. The skilled artisan will appreciate that not all of the elements represented in FIG. 2 are necessary. That is to say, the system design is versatile in that various combinations of subsystems can provide the required attributes of protection and lookthrough in any desired operating band: visible, mid-infrared, and far infrared. Further, some subsystems can be ganged or cascaded to provide simultaneous multiple frequency responses.

At its entrance, system 10 of FIG. 2 includes a mechanical shutter 12 for a large aperture. Preferably shutter 12 has a low mass, so it can close quickly. When shutter 12 is open, light (or other radiation) passes to a sensor window 14. Behind sensor window 14 are long pass and short pass framing filters 16 and 18 respectively. These framing filters simply define the band in which the system operates. Normally, the light (or other energy) passes through a fluence trigger 20 to system detectors 22 at the system output for normal operation of the system in sighting, ranging, designating a target, or the like. Harmful levels of coherent light which are inband to sensor window 14 and framing filters 16, 18 will cause initial system reaction at fluence trigger 20 which preferably will initially block the incoming energy, preventing access to system detectors 22 and other non-robust elements. Various technologies can yield needed fast switch times in trigger 20. These include various plasmas, laser triggered spark gaps, several nonlinear materials, liquid crystals, several colloids, and destructible filters and mirrors. A combination of two or more of these technologies may be made to improve intercept speed and raise optical density.

The preferred fluence trigger 20 comprises a plasma shutter, which uses a laser triggered spark gap. Generally, it includes a lens with a pair of electrodes at the focal point. A high voltage is applied across the electrodes, with the voltage supply set just slightly below the breakdown voltage for an atmosphere between the electrodes. Under normal conditions, one can see through the plasma shutter, but with the input of a laser pulse, the atmosphere at the electrodes undergoes dielectric breakdown. A dry nitrogen gas at standard temperature and pressure can provide the appropriate atmosphere. Once initiated by the laser pulse, the effective gap distance is decreased due to the presence of free electric charges. Such charges then move to one of the high-voltage electrodes, and full breakdown of the spark gap will occur. Once the spark (a plasma) has formed, any remaining portion of the laser input will be strongly reflected and scattered from the spark gap area. A plasma shutter can operate in the subnanosecond range.

There are two major time sequences involved in the total time required to turn on a laser-assisted plasma shutter. The first in the sequence is plasma initiation. This factor is governed by the relative absorption coefficient of the gas with respect to the input energy along with the pulse risetime and intensity or the time rate of energy deposition in the gas. Once the optical field has reached sufficient intensity and energy to initiate a dielectric breakdown of the gas, the area between the electrodes becomes partially conducting. The speed of the electrical avalanche is governed by the drift velocity of the electrons created by the focused laser spot and the effective time constant of the circuit formed by the power supply and the conductive gap.

A plasma shutter of this type is known to the skilled artisan. For example, one is described in U.S. Pat. No. 3,814,503 by D. Milan, issued Jun. 4, 1974, entitled "Ultra-Fast Terminator For Intensive Laser Pulses."

In the generalized system of FIG. 2, a timer 24 can be provided to hold fluence trigger 20 in a blocking state, i.e. a state which protects the detectors 22 from harmful laser radiation. A servo unit 26 may cooperate with timer 24 for this purpose, depending on the nature of trigger 20. If desired, timer 24 and servo 26 could be deployed simply to cause trigger 20 to operate for a long enough time to enable mechanical shutter 12 to close. Timer 24 and servo 26 are both part of the adjustment system 6 of FIG. 1. Timer 24 is further coupled to a pair of servo systems 28 and 30, also part of the adjustment system, and is coupled to the threat analyzer 5 in the form of a fluence sensor 32. Thus, timer 24 receives an acknowledgement signal once filter 7 is in place or once shutter 12 has closed. At this time, trigger 20 can be released from the blocking condition.

Preferably, a neutral density filter 34 is associated with sensor 32 and is arranged to receive incident radiation from the area being observed. Sensor 32 and filter 34 are coupled to a further servo system 36 which as shown in FIG. 2 is coupled to control shutter 12. Fluence sensor 32 and filter 34 perform threshold detection wavelength identification functions and are described infra.

Timing device 24, as mentioned, will maintain fluence trigger 20 in the broadband blocking mode while servo system 36 closes mechanical shutter 12. Also, servo system 28 adjusts a tunable filter 38 to the wavelength or band identified by fluence sensor 32. When shutter 12 has closed, fluence trigger 20 will open. When tunable filter 38 has been adjusted to block the identified wavelength, shutter 12 reopens. System 10 is thereby restored to full operation. The pacing element time-wise in the system can be either the tunable filter 38 but could be shutter 12, in which case the shutter may not be desired. The tunable filter 38 is normally used in visible band systems, and more than one may be required. Alternatively, filter 38 could be replaced or supplemented by a band blocking filter wheel in far-IR systems. Mid-IR systems could use either or both types of adjustable filters. Accordingly, also represented in FIG. 2 is a filter wheel 40. Controlled by servo system 30, this interposes discrete band blocking filters into the optical path. It can be used alone or in combination with tunable filter 38, depending on the application.

A scan mirror 42 also is represented in FIG. 2. It will be understood by persons skilled in the art that a scan mirror is used with a focal plane array (noted as "FPA" in block 22) when infra-red sensing is employed. A reticle 44 and optics 46 also are shown in FIG. 2. These are customary to optical sighting or detecting systems and require no explanation.

Persistent high flux makes the use of a tunable neutral density filter 34 desirable at several places in the system. Such a device is preferably always included on the front end of the threat analyzer (fluence sensor 32), as shown in FIG. 2, so that the threshold could be varied. Continuously adjustable neutral density filters could be varied depending upon threats, threat ranges, and atmospheric conditions in the primary sensor (detector 22) field of view. The tunable neutral density filter 34 could be controlled manually or by an on-board laser rangefinder, and can be tuned by, for example, polarization controlled by electric fields in dielectric materials.

Concerning filter 38, various etalons can be used, such as electro-optically tuned Fabry-Perot filters in which the pass band is determined by the optical boundary conditions of an optically resonant cavity. Kerr cells and Pockels cells which exhibit quadratic or linear electro-optic effects respectively, in which index changes result from the nonlinear response of certain crystalline materials when an electric field is applied, may be applicable as substitutes, as may liquid crystal technology. Improvements may result from employing two or more techniques or cascading one technique in order to achieve a particular broadband response. Double cavity Fabry-Perot filters are an example of cascading.

The technology for filter wheel 40 is fairly well developed, particularly in the far-IR where filter wheels are of maximum usefulness. High switching speed is preferable. Electrically tunable continuous or detent filters could be substituted in other embodiments.

Figure 3:
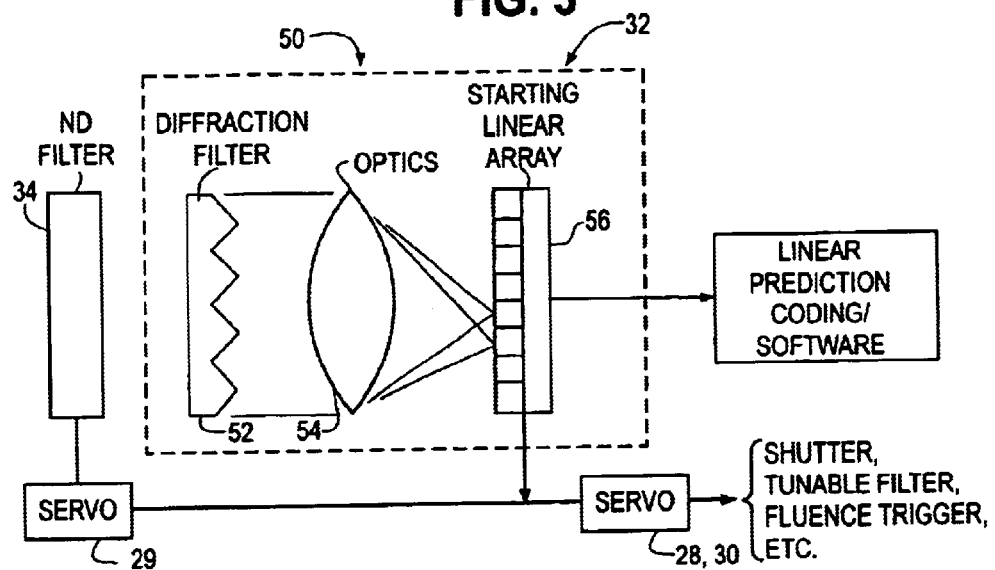
FIG. 3 shows a threat analyzer used in FIGS. 1 and 2.

FIG. 3 illustrates threat analyzer 5 which includes a fluence sensor system 50 including a spectrometer which perform the sensing and identification functions. As shown in FIG. 3, light (or other radiation) is admitted via neutral density filter 34. Then a diffraction filter 52 and an optical system or lens 54 focuses the incident light on a linear array 56. The elements of array 56 depend on the band of operation of the system being protected. For far infra-red applications, to avoid cryogenic cooling, the array may use lithium tantalate detectors. Filter 52 and optics 54 perform the basic function of breaking out the frequencies of the incident laser and focusing those component frequencies on array 56. Each element in array 56 can correspond to a frequency or subband. Linear array 56 may be expanded and cascaded to provide any desired degree of bandwidth detection down to one nanometer or less.

Array 56 provides an output to electronic circuitry which may simply comprise a look-up table which correlates the detected wavelengths to the type of filter, the bandwidth to be chosen from a filter wheel or the like, or the frequency to which a tunable filter should be tuned. This is a straightforward conversion from array 56 to a filter selection. In this fashion, the spectral composition of the attacking laser is discovered or analyzed, within the context of the filter(s) needed for a countermeasure. It will be understood that more than one filter may be needed to compensate for the laser radiation, which may have multiple frequencies. Thus, plural filter devices can be included in the FIG. 2 embodiment, such as two filter wheels 40 with one or more tunable filters 38, as desired. When the threat analyzer identifies plural frequencies of incident coherent radiation, then plural filters can be interposed in the optical path under control of appropriate servosystems or other adjustment devices.

The output of array 56 is coupled to servosystems 28, 29 and/or 30. Optionally, array 56 can also provide an input to a linear prediction coding system 58 which can predict the next frequency to be used by an attacking laser undergoing frequency change. The linear prediction apparatus 58 monitors the history of frequency and dwell time and on that basis predicts the time of occurrence and frequency shift for the next change. This is optional within the scope of the present invention because once a given filter is placed, if a new laser wavelength passes through the filter, trigger 20 will defend against it, and threat analyzer 5 will select another filter as a replacement or supplement.

In conclusion, system 10 represents and includes hybrid type survivable sensors which can function in the environment of the broadband laser threat. The hybrid arrangement also allow the system to take advantage of the strengths of various technical approaches while compensating for their shortcomings elsewhere in the system. Some technologies which might be of limited or marginal value as stand-alone countermeasures can significantly enhance system survivability when suitably integrated into the entire system.

FIG. 2 has shown a generalized system which the ordinarily skilled artisan should have no problem in implementing. An example is now provided, however, to illustrate more particularly how the present invention can be used.

One detector system that is commonly used in military applications is the FLIR, which stands for Forward Looking Infrared. This operates in the portion of the electromagnetic spectrum where the wavelength is nominally from eight microns to twelve microns. Using FLIR, the eye does not look directly at the optics, but instead at a cathode ray tube. Because of this, mission continuity can tolerate saturation from a laser attack for a short time. A carbon dioxide laser operates in the same frequency range as FLIR systems and therefore can pose a threat. If a carbon dioxide laser "hits" the system, the system goes to saturation, normally causing the CRT picture to go white.

An armored vehicle such as a tank may use a filter wheel on its FLIR system to defend against various attacking lasers. This prior approach has called for manual tuning, however. Illustratively, there would be five positions on a filter wheel, of which one position interposes no filtration. The other four filters respectively could filter the subbands of 8–9 microns, 9–10 microns, 10–11 microns, and 11–12 microns. The idea is that a crewman would notice from the white CRT screen that the, FLIR system has become saturated and would assume that the tank is under laser attack to jam its FLIR sighting system. The crewman would then manually rotate the filter wheel from one position to the next until the proper filtration for the subband results in restoration of the FLIR system detection. This procedure can be expected to take ten seconds or more. Unfortunately, this is generally fatal because in that time, the enemy can successfully fire upon the tank. Thus, the manual tuning approach appears to have some significant deficiencies.

A system using the present invention overcomes this problem and operates without manual intervention to provide a full countermeasure so quickly that no interruption in mission continuity is experienced. It automatically restores see-through to maintain the mission.

Figure 4:
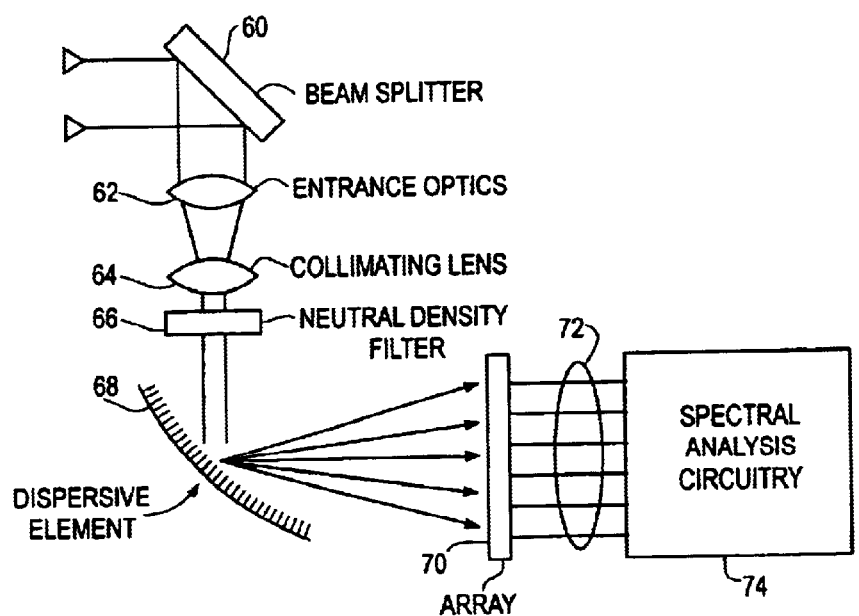
FIG. 4 shows another threat analyzer.

The threat analyzer for a FLIR system is illustrated in FIG. 4 which is quite similar to FIG. 3. FIG. 4 shows a beam splitter 60 in the sensor optical path which directs a portion of the light toward entrance optics 62 and a collimating lens 64. A collimated beam is then passed through a neutral density filter 66 to obtain proper exposure control. From there, the beam is directed to a dispersive element or grating 68. This may be, for example, a concave reflection grating or transmissive slits or grating. This disperses the beam to a linear detector array 70 which provides parallel outputs 72 to electronic circuitry 74. Electronic circuitry 74 analyzes the spectral profile of the attack laser.

Various mechanisms can be used to eliminate false alarms due to ambient or incoherent light which enters the threat analysis system of FIG. 4. The simplest approach is to set the exposure control (via filter 66) so that only very bright pulses will be registered with a given responsivity detector. Another method involves electronic thresholding or clamping added to the system after the detectors have generated a signal. A third approach is to allow the electronics 74 to generate a warning signal only for signals which have sufficiently narrow band width to qualify as a laser threat.

Once electronics 74, which can comprise sample and hold electronics or a storage oscilloscope, analyzes the threat, it inputs this data to the adjustment system which may comprise a microprocessor based computer or, more simply, a look-up table, which determines the filter or filters best able to counter the threat. The adjustment system then causes one or more filter wheels to rotate to the proper filter or combination of filters so that the threat is blocked from the sensor optical path, thereby allowing the sensor to continue its mission.

The person skilled in the art will appreciate that when implementing the FIG. 2 embodiment to a FLIR system, shutter 12 may be eliminated. Window 14 admits radiation, and framing filters 16 and 18 eliminate radiation outside of the eight to twelve micron wavelength. Additionally, tunable filter 38 can be eliminated in favor of a simple filter wheel 40 having a number of subband filters thereon. If the concern is lower level coherent radiation, i.e. jamming rather than damage levels of radiation, then fluence trigger 20 is unnecessary, along with servo 26 and timer 24. The threat analyzer of FIG. 4 can be constantly operating due to the beam splitter being positioned in the sensor optical path thereby to provide incident radiation constantly to array 70 for constant threat analysis. Filter wheel 40 therefore operates under control of servo 30 whenever a laser attack occurs and is analyzed. This all operates within a 30 millisecond time so that mission continuity is preserved.

There are some occasions when both a filter wheel and a tunable filter are desirable. For example, day sights on tanks contemplate that the detector of the system is the eye of a crewman. The spectral response of the human eye is centered nominally a wavelength of about 0.530 microns and has fairly poor response in the regions below about 0.4 microns and above about 0.7 microns. If a fixed filter on a filter wheel blocks radiation over a 0.40 micron wavelength band width, this could result in substantial attenuation of the visible field-depending on where the 0.40 micron band is centered. That is to say, insertion of a filter to block light from 0.30 microns to 0.7 microns would effectively destroy the usefulness of the day sight. Such a filter can be used, however, for handling broad bands at the edges of the eye response curve where attenuation of the signal will not result in appreciable degradation of sighting ability. One or more tunable filters would complement the filter wheel for more selective tuning (narrower band width tuning) in the primary visible spectrum. In this application, fluence trigger 20 is needed to prevent damage to the eye.

Thus it will be seen that the present invention provides a degree of flexibility dependent upon system parameters of the band width of system operation, the type of detector, and the type of threat. In some applications, an embodiment of the invention detects attack energy frequency and interposes the proper filter(s). In more sophisticated embodiments, the present invention blocks, reflects, scatters or otherwise guards against incoming coherent radiation in the sensor optical path, identifies the attack energy frequency, protects the system while tuning, and restores the system with a filter in place, all in a fraction of a second. In all cases, mission continuity is preserved. Consistent with the description provided herein,; the ordinarily skilled artisan will be able to find various implementations of the system and the method to provide a countermeasure against laser attack. In the event that the laser attack uses variable tuning, a prediction capability can be included, as illustrated with respect to FIG. 3, or the system may be relied upon to update as often as necessary the selection of filters. For example, if a first filter is deployed by the system and then the laser attack frequency is changed, fluence trigger 20 will again operate to prevent the new laser frequency radiation from continuing entirely through the sensor optical path to reach detector 22. The threat analyzer will again identify the new frequency and cause the adjustment of the filters to countermeasure it.

It is to be understood that the present disclosure has been illustrative and that various modifications can be made within the scope of the present invention which is defined by the appended claims.

I claim:

1. A method for providing countermeasures against laser radiation in a sensor system having an optical path between an entrance and an output comprising the steps of:
   if laser radiation is incident at said entrance, then automatically stopping the passage of laser radiation along said optical path to said output;
   automatically identifying the spectral components of the laser radiation;
   automatically tuning a filter system within the optical path while protecting said output from said laser radiation; and
   restoring said system after said tuning step.

2. The method according to claim 1 wherein said stopping step comprises detecting coherent radiation and interposing a means for stopping the passage of or attenuating such radiation to said output.

3. The method according to claim 2 wherein said stopping step comprises operating a plasma trigger by interposing said plasma trigger along said optical path, and forming a plasma when coherent radiation enters said plasma trigger, the plasma being positioned to prevent the passage of substantial coherent radiation beyond said trigger.

4. The method according to claim 1 wherein said identifying step includes receiving a beam having said laser radiation therein, dispersing radiation into spectral components, and automatically detecting such components.

5. The method according to claim 4 wherein said detecting step includes directing said spectral components to a detector array which detects subbands or frequencies.

6. The method according to claim 1 wherein said tuning step comprises automatically selecting a band or frequency to be blocked in response to said identifying step.

7. The method according to claim 6 wherein said tuning step comprises operating a filter wheel to interpose a selected filter into the optical path.

8. The method according to claim 6 wherein said tuning step comprises operating a tunable filter to interpose a filter of selected frequency in said optical path.

9. The method according to claim 6 wherein said tuning while protecting step includes automatically closing a shutter in said optical path during said tuning operation.

10. The method according to claim 1 wherein said restoring step comprises unblocking the optical path after said tuning has been completed.

11. A method for providing counter-measures against a laser attack on a sensor system having an optical path between an entrance and an output comprising the steps of:
    detecting incident radiation including coherent radiation in said optical path and automatically interposing a means for preventing or attenuating the further passage of said coherent radiation to said output;
    identifying the spectral components of said coherent radiation by receiving a portion of said incident radiation, dispersing said coherent radiation into one or more components, and detecting said components of said coherent radiation;
    in response to the detection of components of coherent radiation in said identifying step, automatically selecting a filter band or frequency to eliminate or substantially attenuate the coherent radiation and automatically interposing into the path a filter having such filter band or frequency; and
    after said interposing step, restoring the optical path to permit passage of radiation from said entrance to said output.

12. A system to provide counter-measures against laser attack against a sensor system having an optical path between an entrance and an output comprising:
    a trigger device located along said optical path, said trigger device being responsive to coherent radiation to block or substantially attenuate the passage of such coherent radiation beyond said trigger device to said output;
    a threat analyzer coupled to receive incident radiation including means for identifying the spectral components thereof;
    an automatic adjustment system responsively coupled to said threat analyzer;
    a controllable filter device interposed in said optical path between said entrance and said trigger device, said controllable filter device being responsively coupled to said adjustment system.

13. The system according to claim 12 wherein said trigger device comprises a plasma trigger.

14. The system according to claim 12 wherein said threat analyzer includes a means for separating incident energy into spectral components and a photo-detective apparatus positioned to receive said spectral components and provide an electrical indication thereof.

15. The system according to claim 12 wherein said filter device includes a filter wheel.

16. The system according to claim 12 wherein said filter device includes a tunable filter.

17. The system according to claim 12 further comprising a shutter responsively coupled to said trigger for preventing the entrance of any radiation to said optical path.

18. The system according to claim 12 wherein said trigger device is responsively coupled to said adjustment system so that it can be released from a blocking condition by said adjustment system.

19. An automatic system for providing countermeasures against laser attack of a sensor system which includes an entrance and an output having an optical path therebetween, the system comprising:

a trigger device along said optical path, said trigger device including means for automatically blocking the passage of coherent radiation therethrough;

a threat analyzer including a means for dispersing radiation into spectral components and a means for detecting said spectral components;

a controllable filter device interposed in said optical path between said entrance and said trigger device;

an adjustment system responsively coupled to said threat analyzer and controllingly coupled to said filter device, whereby when coherent radiation passes through said entrance, said trigger is activated to prevent the passage of coherent radiation to the output, the radiation is analyzed, and an appropriate filter is interposed along said optical path so that said optical path can be restored to operation free of danger from said coherent radiation.

20. A method for providing countermeasures against laser radiation in a sensor system having an optical path between an entrance and an output comprising the steps of:

receiving incident radiation and automatically identifying the spectral components of laser radiation therein; and automatically interposing a filter into the optical path, said filter corresponding to the identified spectral components.

* * * * *